C. P. CRISSEY.
CONTROL OF STAGE VALVES.
APPLICATION FILED SEPT. 8, 1910.

1,020,684.

Patented Mar. 19, 1912.

Witnesses:
George H. Tilden
J. Ellis Glen

Inventor,
Clarence P. Crissey,
by Albert G. Davis
Att'y.

UNITED STATES PATENT OFFICE.

CLARENCE P. CRISSEY, OF LYNN, MASSACHUSETTS, ASSIGNOR TO GENERAL ELECTRIC COMPANY, A CORPORATION OF NEW YORK.

CONTROL OF STAGE-VALVES.

1,020,684.

Specification of Letters Patent. Patented Mar. 19, 1912.

Application filed September 8, 1910. Serial No. 581,043.

*To all whom it may concern:*

Be it known that I, CLARENCE P. CRISSEY, a citizen of the United States, residing at Lynn, county of Essex, State of Massachusetts, have invented certain new and useful Improvements in the Control of Stage-Valves, of which the following is a specification.

This invention relates to multistage turbines actuated by elastic fluid, such as steam, and its object is to effect the closing of one or more stage valves when steam is extracted from one of the higher stages and it is desired to keep the pressure in said stage above a certain limit. The stage valves are normally controlled by the steam pressure in the space between the nozzle valves and the nozzles. By my invention this control can be interrupted when steam is led off from the wheel chamber for industrial purposes, and the pressure in said chamber drops below a predetermined limit.

Figure 1:
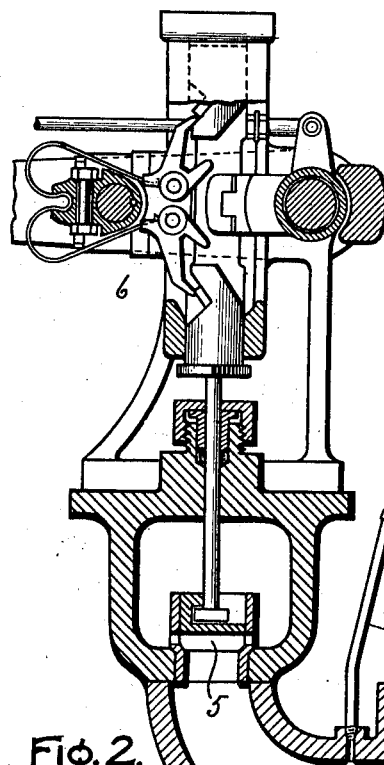
Figure 2:
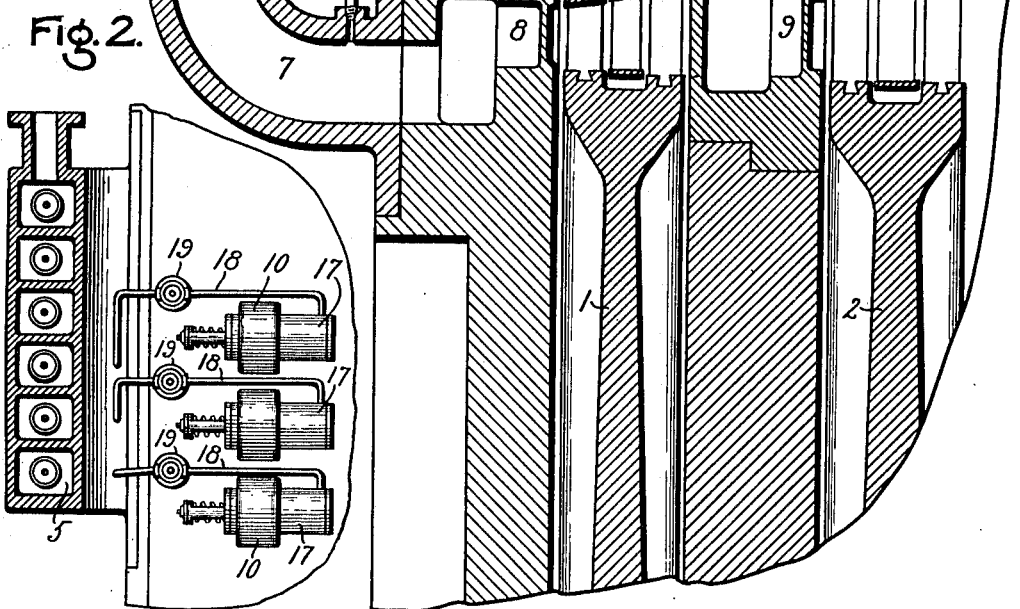

In the accompanying drawing, Figure 1 is a sectional view of a portion of a turbine equipped with my stage valve cutoff, and Fig. 2 is a sectional plan view of a portion thereof.

The turbine shown is one in which the velocity of the elastic fluid is fractionally extracted in two stages, being caused to operate on two rotatable wheels 1 and 2 arranged in separate chambers 3 and 4. Steam or other elastic fluid is admitted to the first stage through a nozzle valve 5 operated by suitable mechanism 6 such as that shown in the patent to R. H. Rice, No. 815,743, Mar. 20, 1906. From the supply chamber 7 below the valve, the steam passes to the nozzle 8 and thence to the first row of buckets on the wheel 1. After having passed through and operated on the wheel in the first stage, the steam flows through the nozzles 9 into the second stage and acts upon the wheel 2. The passages between the first stage and the nozzles of the second stage, however, are in some cases controlled by stage valves, so called, one of which is shown in Fig. 1 and three of which are shown in the plan view, Fig. 2.

Each stage valve comprises a casing 10 divided into two compartments by a septum 11 in which is a port 12 controlled by a valve 13 whose stem 14 extends through the walls of the casing in both directions. One end is connected to a spring 15 which tends to keep the valve closed. The other end of said stem is connected to a movable abutment, (such as a piston 16 in the cylinder 17) exposed to the pressure of the elastic fluid in the supply chamber 7, by means of a pipe 18 leading from said space to said abutment. When the nozzle valve 5 is closed, no fluid can pass through the pipe 18 to the cylinder 17, and the spring 15 is at liberty to hold the valve 13 closed. If, however, the load on the turbine be increased so that the mechanism 6 opens the valve 5, some of the working fluid will pass through the pipe 18 and force the piston 16 to the left in Fig. 1, overcoming the tension of the spring 15 and opening the valve 13. This provides an increased area of passage to the second stage, thereby accommodating for the increased volume of fluid admitted to the first stage. This is the normal mode of operation of the so called stage valves.

In case steam is drawn from the chamber 3 for heating or other industrial purposes, the pressure in said chamber will be reduced below a proper limit for efficient operation unless one or more of the stage valves be closed to retard the escape of steam and thus hold in the pressure. In order to accomplish this, I cut the pipe 18 and interpolate between its ends a cylinder 19 connected with the chamber 3 by a duct 20. Above said duct, but below the entrances of the two sections of the pipe 18 is a movable abutment such as the piston 21. On the stem of said piston and above said pipe connections is a second piston 22, which serves as a valve to control the flow of fluid through the pipe 18. The weight of the pistons and stem is preferably partly sustained by a spring 23 acting against a collar 24 on the stem. An air vent 25 is located above the piston 22. The parts are so proportioned that the two pistons stand in their highest position, as shown, when the stage valve is in normal operation; that is to say the pressure in the chamber 3 (first stage) is sufficient, in addition to the lift of the spring 23, to overcome the weight of the pistons and their stem. In this position steam can flow freely from the supply chamber 7 to the cylinder 17 of the steam motor, to open the stage valve. But when the first stage pressure falls by reason of extraction to a value below that proper for efficient operation, then the pistons drop and the upper one closes one of the pipe entrances and cuts off the flow of steam to the stage valve, which thereupon closes so that the pressure in the chamber 3 is maintained, or may even rise. By suitably adjusting the springs 23, the cut-off devices for a plurality of stage valves may be set to operate successively, in correspondence with varying drops in pressure in the first stage chamber 3. Thus in Fig. 2, three stage valves are shown, each with its own individual cut-off. While I have described my invention as applied to a two stage machine, yet it will be obvious that it is equally applicable to a turbine having three or any number of stages.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a multistage turbine provided with admission valves and stage valves and having a stage from which steam is extracted, of means for simultaneously opening an admission valve and a valve between said stage and the next lower stage, and means responsive to the pressure in the stage from which the steam is extracted for also controlling the stage valve without affecting the admission valve.

2. The combination with a multistage turbine provided with stage valves, of means for automatically cutting off said valves when steam is extracted from the stage supplying said valves, said means comprising a device responsive to pressure changes in said stage and controlling the flow of the steam which actuates said valves.

3. The combination with a multistage turbine, of a stage valve actuated by steam from the supply chamber of the higher stage nozzles, a cut-off in the pipe conveying said steam to said valve, and a movable abutment exposed to the stage pressure and adapted to operate said cut-off.

4. The combination with a multistage turbine, of a stage valve, a pipe conveying steam to actuate said valve from the supply chamber of the higher stage, a cylinder interpolated in said pipe, a piston valve in said cylinder controlling said pipe, and a duct conveying the higher stage pressure to the under side of said piston valve to hold it open under normal conditions of operation.

5. In a multistage turbine having a stage from which steam is extracted, the combination of a stage valve between the extraction stage and a lower stage, means for controlling the stage valve that is actuated by steam from a region of the turbine preceding the extraction stage, and means responsive to the pressure in the extraction stage for also controlling said valve.

6. In a multistage turbine having a stage from which steam is extracted, the combination of a stage valve between the extraction stage and a lower stage, a device that tends to keep the valve closed, a motor for opening the valve in opposition to said device, a conduit conveying steam to the motor from a region of the turbine preceding the extraction stage, and valve means that controls the flow through the conduit to the motor, said means being responsive to the pressure in the extraction stage and acting to shut off the steam to the motor and thereby close the valve when the pressure in said stage tends to fall below a predetermined limit.

In witness whereof, I have hereunto set my hand this third day of September, 1910.

CLARENCE P. CRISSEY.

Witnesses:
FRANK G. HATTIE,
EDW. C. PERRY, Jr.